(12) United States Patent
Arimoto

(10) Patent No.: US 7,673,419 B2
(45) Date of Patent: Mar. 9, 2010

(54) REAR WINDOW SLIDER ASSEMBLY

(75) Inventor: Shigeki Arimoto, Bloomfield, MI (US)

(73) Assignee: Hi-Lex Controls, Inc., Rochester Hills, MI (US)

( * ) Notice: Subject to any disclaimer, the term of this patent is extended or adjusted under 35 U.S.C. 154(b) by 0 days.

(21) Appl. No.: 12/098,785

(22) Filed: Apr. 7, 2008

(65) Prior Publication Data

US 2009/0250975 A1 Oct. 8, 2009

(51) Int. Cl.
*B60J 1/18* (2006.01)
*E05D 15/06* (2006.01)

(52) U.S. Cl. .............................. 49/380; 49/413; 49/213; 296/146.16

(58) Field of Classification Search ............ 296/146.16; 160/90, 103; 49/413, 374, 380, 209, 213, 49/116, 502, 441, 479.1
See application file for complete search history.

(56) References Cited

U.S. PATENT DOCUMENTS 4,124,054 A * 11/1978 Spretnjak ..................... 160/90
5,799,449 A * 9/1998 Lyons et al. ............... 52/204.51
7,185,943 B2 * 3/2007 Lesle et al. ............. 296/146.16
2003/0182865 A1 * 10/2003 Nestell et al. ................. 49/374
2004/0100121 A1 * 5/2004 Bourque et al. ......... 296/146.16
2005/0044797 A1 * 3/2005 Daniel et al. .................. 49/413
2006/0107600 A1 * 5/2006 Nestell et al. ................. 49/413

* cited by examiner

*Primary Examiner*—Patricia L Engle
*Assistant Examiner*—Sunsurraye Westbrook
(74) *Attorney, Agent, or Firm*—Brinks Hofer Gilson & Lione

(57) ABSTRACT

The present specification provides a rear window assembly for a vehicle having a window frame, at least one fixed window panel whose perimeter edge defines a portion of an opening, a movable window panel capable of opening or closing the opening and that is allowed to slidably move past the surface of the fixed window panel, a seal member present on the perimeter surface of at least one of the window panels, and a closure track integrally formed in at least one edge of the window frame. The closure track may force the movable window panel and the fixed window panel closer together, thereby, placing the seal member under compression.

15 Claims, 4 Drawing Sheets

REAR WINDOW SLIDER ASSEMBLY

FIELD OF INVENTION

This disclosure relates to a window assembly for vehicles, such as a rear window slider assembly used with a pick-up truck and the like.

BACKGROUND OF INVENTION

Many vehicles, such as light trucks, and particularly pick-up trucks, currently sold in the marketplace often have a rear window assembly with a sliding window panel. Typically, these rear slider window assemblies include a frame structure that provides support for multiple fixed window panels and at least one movable window panel. Each window panel includes a substantially transparent region and an opaque border region commonly referred to as a sash. The movable window panel is held in position in the frame structure using multiple fixed pins and spring pins. The spring pins are normally located in the opaque sash of the movable window panel either on top of or below the transparent region of the window panel. These spring pins interact with a hole created in the frame structure associated with the rear window assembly. Usually, the pins move to engage the holes when the movable window panel is in its fully opened or closed positions. An elastomeric seal member is usually attached to either the movable window panel or the fixed window panel to provide a weatherable seal.

When the rear window assembly is in its closed position, this seal member forms a weatherable seal separating the interior of the vehicle from the external environment. Unfortunately, conventional rear window slider assemblies may encounter the occurrence of a "wobble" condition. This "wobble" condition occurs due to the clearance that is necessary between the outer diameter of the spring pin located in the sash of the movable window panel and the inner diameter of the hole created in the frame structure for the rear window assembly in order to maintain the window assembly in a closed position. The occurrence of this "wobble" condition reduces the effectiveness of the weatherable seal created when the window is closed. Furthermore, when the movable window panel is in a closed position, the seal member may not be adequately compressed to provide an effective weatherable seal. Insufficient compression of the seal member may also lead to undesirable "buzz, squeak, and rattle" ("BSR") conditions.

There is a desire in the industry to reduce the occurrence of any "wobble" and to enhance the sealing between the fixed and movable window panels.

SUMMARY OF INVENTION

One form of the present specification is to provide a rear window assembly for a vehicle having a window frame, at least one fixed window panel whose perimeter edge defines a portion of an opening, a movable window panel capable of opening or closing the opening and that is allowed to slidably move past the surface of the fixed window panel, a seal member present on the perimeter surface of at least one of the window panels, and a closure track integrally formed in at least one edge of the window frame. The closure track may force the movable window panel and the fixed window panel closer together, thereby, placing the seal member under compression.

The movable window panel may include both a substantially transparent region and a border region or sash. Both of these regions may be formed from glass or a thermoplastic material and may be made of the same or different material. The border region may be relatively opaque in comparison to the transparent region.

In another form of the present specification, the closure track of the window assembly has an origination point that makes a predetermined angle ($\delta$) between the linear path of the movable window panel and the end point of the closure track. This predetermined angle ($\delta$) may assist in forcing the movable window panel closer to a fixed window panel when the window opening is closed. The predetermined angle ($\delta$) may range from 0 degrees to about 90 degrees.

The closure track may also have an indentation or hole. The indentation may have an inclined wall that can increase the depth of the indentation starting from its origination point in the closure track to its end point at the end of the closure track. This inclined wall may further make an angle ($\phi_2$) with the closure track, thereby establishing a ramp. This angle ($\phi_2$) may be greater than about ninety degrees. The closure track may be integrally formed from a thermoplastic material using injection molding, thermoforming, or an extrusion process.

The movable window panel may include at least one closure pin and one coil spring. This spring loaded pin may intersect with the inclined wall or ramp in the closure track to actively force the movable window panel toward its closed position and against a fixed window panel, thereby, compressing the seal member to form a weatherable seal. The closure pin may be pushed by the coil spring to span the full depth of the closure track. The closure pin can be located in the border region on either the left or right side of the movable window panel. The placement of the pin in this location allows the length of the closure pin to be greater than about the width of the border region located above or below the transparent region.

Further areas of applicability will become apparent from the description provided herein. It should be understood that the description and specific examples are intended for purposes of illustration only and are not intended to limit the scope of the present specification.

BRIEF DESCRIPTION OF THE DRAWINGS

The drawings described herein are for illustration purposes only and are not intended to limit the scope of the present specification in any way.

DETAILED DESCRIPTION OF INVENTION

Figure 1:
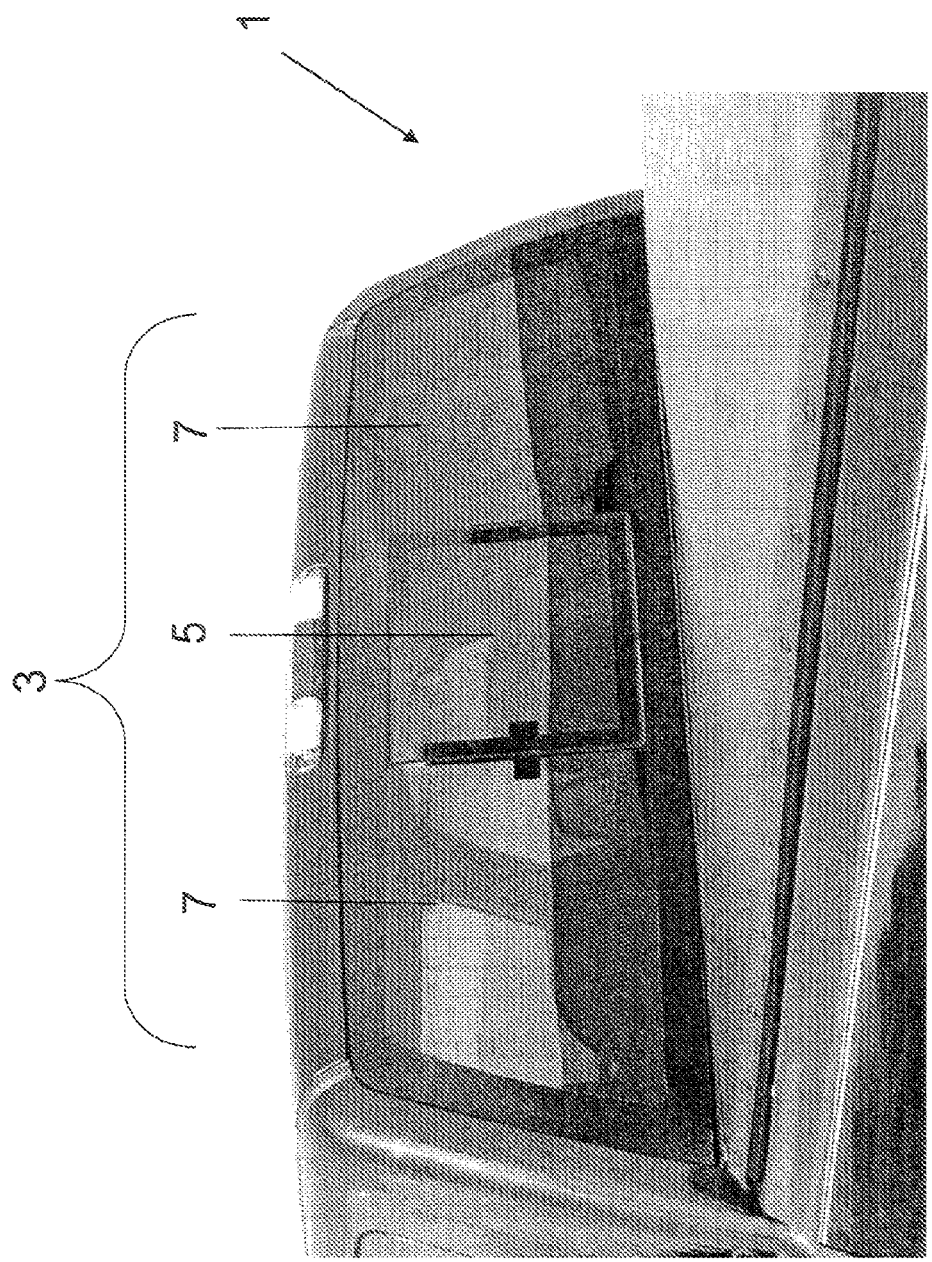
FIG. 1 is a perspective view of a rear window slider assembly for a pick-up truck according to one embodiment of the present specification.

The following description is merely exemplary in nature and is in no way intended to limit the present disclosure or its application or uses. It should be understood that throughout the description and drawings, corresponding reference numerals indicate like or corresponding parts and features.

Referring to FIG. 1, a rear window slider assembly 3 for a pick-up truck 1 according to one embodiment of the present specification is shown. The rear window slider assembly 3 may comprise at least one stationary window panel 7 and at least one movable or slidable window panel 5. The slidable window panel 5 moves relative to the fixed window panels 7 to open and close an opening in the rear window slider assembly 3. The window opening may be defined by at least one perimeter edge of a fixed window panel 7 and the slidable window panel 5. The slidable window panel 5 may move in or along rails, channels, or tracks (not shown) that may be affixed to the frame of the rear window slider assembly 3 or to the frame of the pick-up truck. Such closure tracks may also be attached, bonded, or affixed to the fixed window panels 7. The fixed window panels 7, the slidable window panel 5, or both may further include a seal member (not shown) that is either adhered, bonded, or molded to the perimeter of the panel to make a weatherable seal when the window opening is closed.

The fixed 7 and slidable 5 window panels may be comprised of glass, thermoplastic materials, or any other materials known to one skilled-in-the-art of window glazing. Examples of thermoplastic resins suitable for use as a window panel include, but are not limited to, polycarbonate resins, acrylic resins, polyarylate resins, polyester resins, and polysulfone resins. The thermoplastic material may be formed into the window panel through the use of injection molding, thermoforming, extrusion, or any other means known to one skilled-in-the-art of thermoplastic components.

Figure 2:
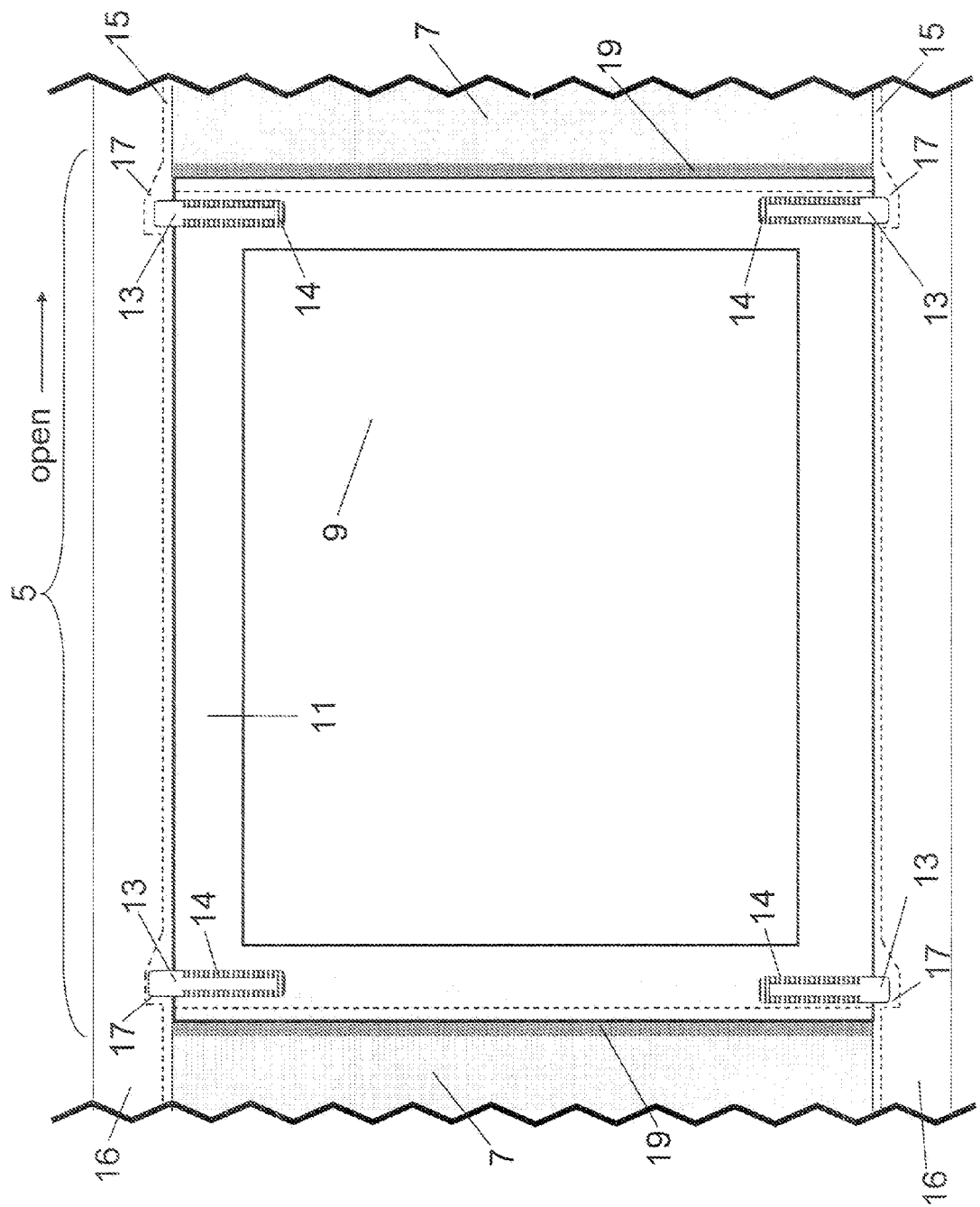
FIG. 2 is a perspective schematic of the sliding portion of a rear window slider assembly according to one embodiment of the present specification illustrating the closure mechanism incorporated into the slider assembly in a closed position.

Referring now to FIG. 2, the slidable window panel 5 may have a substantially transparent region 9 and a border region or sash 11. The substantially transparent region 9 provides visibility for the driver and passengers inside the vehicle when looking through the rear slider window assembly 3. The border region or sash 11 may be substantially opaque in order to provide a way to hide the closure mechanism of the slidable window panel 5; protect any adhesive, such as those used to adhere a seal member to the slidable window panel 5, from degradation due to exposure to UV radiation; or hide any other imperfections caused by the machining tolerances associated with making the components that comprise the frame of the vehicle.

The border region 11 and the substantially transparent region 9 may be made out of either the same material or different materials. Examples of materials that may be used for the border region include, but are not limited to, glass, polyamides, acrylics, polyalkyene terephthalates, polycarbonates, polyurethanes, acrylonitrile butadiene styrene (ABS), polyesters, nylon, polyoxymethylene (POM), nylon, polypropylene, and mixtures or blends thereof. The border region 11 may incorporate colored dyes or films, as well as opaque pigments or fillers to obscure the transmittance of light through this region. The border region, as well as an closure track or frame for the window slider assembly may be integrally formed through the use of injection molding, thermoforming, extrusion, or any other means known to one skilled-in-the-art of thermoplastic components.

The slidable window panel 5 may reversibly move within a closure track 15 formed in conjunction with at least one frame 16 of the rear window slider assembly 3. The closure mechanism for the slidable window panel 5 includes at least one closure pin 13 incorporated into or mounted with the border region 11 of the slidable window panel 5. In FIG. 2, the slidable window panel 5 is shown to have four closure pins 13. One skilled in the art would realize that less than or more than four pins could be utilized. The closure pin 13 may be pushed near or against the bottom of the closure track 15 by a coil spring 14.

Figure 3:
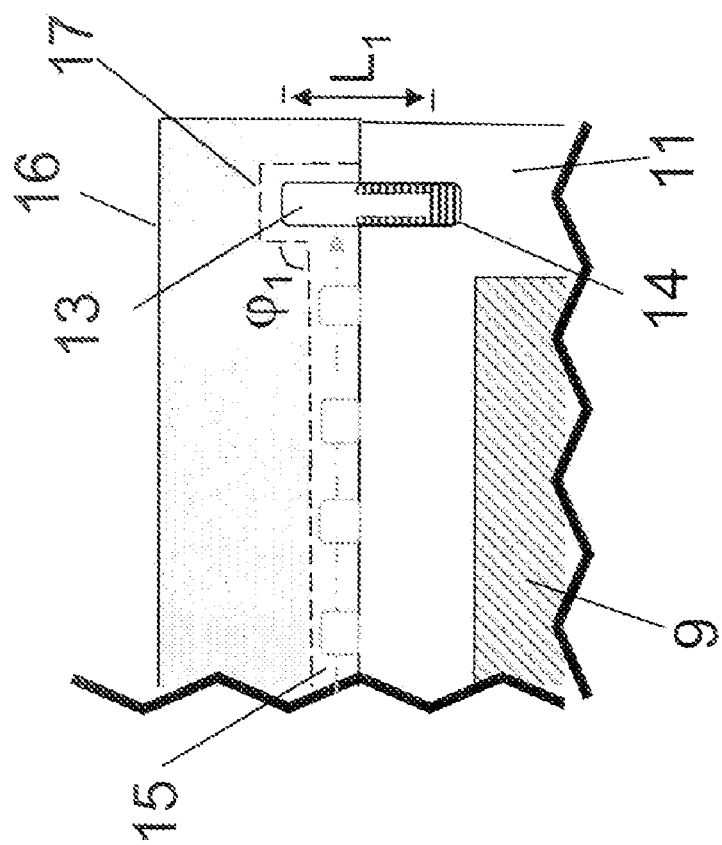
FIG. 3 is a cross-sectional schematic taken in the plane of the window panels that illustrates a conventional closure mechanism for a rear window slider assembly in a closed position.

In FIG. 3, the closure mechanism for a conventional slidable window panel 5 is depicted. Here the closure track 15 in the frame 16 of the rear slider window assembly in which the border region 11 of the slidable window panel 5 moves may further comprise an indentation 17 or hole. The closure pin 13 in a conventional slidable window panel 5 is typically located in the border region 11 positioned directly above, below, or alongside the transparent region 9 of the window panel 5. The length of the pin in this location is usually limited to the length ($L_1$) necessary to reach the bottom of the hole or indentation as shown in FIG. 3. The indentation or hole 17 is slightly larger in diameter than the closure pin 13 and has a depth that is about equal to the length of the closure pin that will be inserted. The hole 17 makes an angle ($\phi_1$) with the closure track 15 in the frame 16 as shown in FIG. 3. In a conventional rear window assembly this angle ($\phi_1$) is about ninety degrees.

When the closure pin 13 slides over this indentation 17, the expansion force of the coil spring 14 forces the closure pin 13 into the indentation 17, thereby locking the slidable window panel 5 in a closed position. A mechanical window attachment (not shown), such as a clasp or latch, located on the surface of either the slidable window panel 5, fixed window panel 7, or frame 16 that faces the interior of the vehicle 1 may release the closure pin 13 from the indentation 17, thereby, allowing the slidable window panel 5 to be reversibly moved to an open position.

Figure 4C:
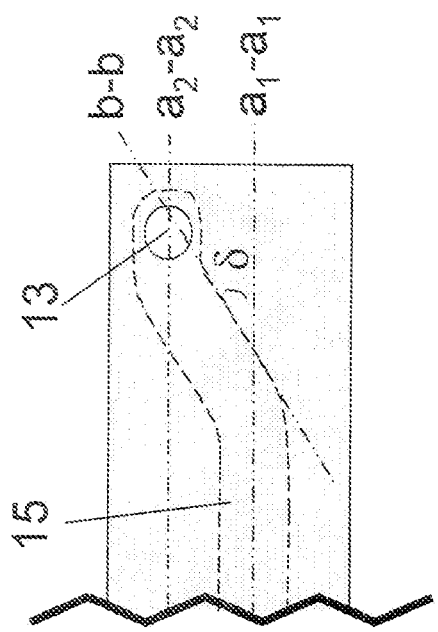
FIG. 4C is an orthographic top-down projection of the closure mechanism according to another embodiment of the present specification.
Figure 4B:
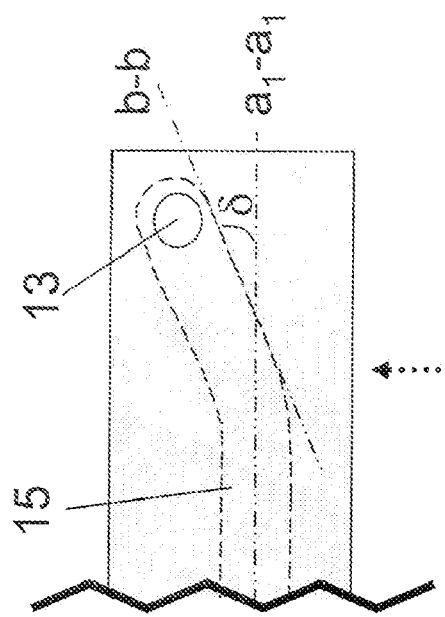
FIG. 4B is an orthographic top-down projection of the closure mechanism described in FIG. 4A.
Figure 4A:
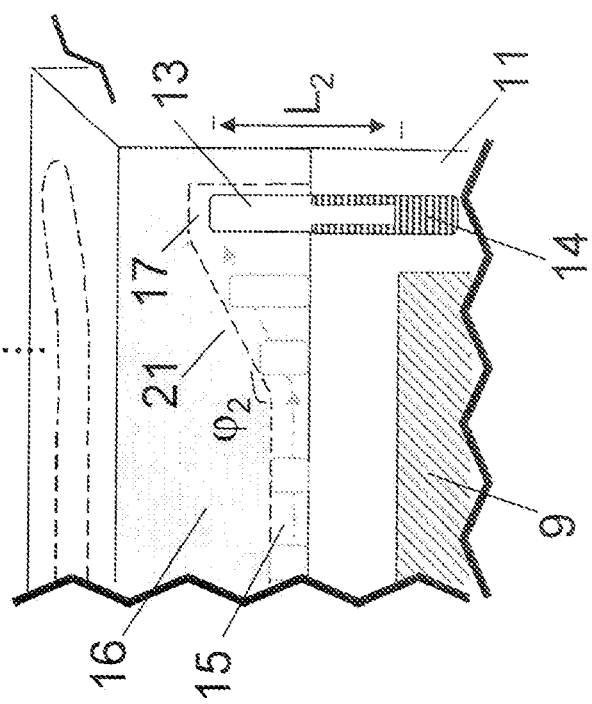
FIG. 4A is a cross-sectional schematic taken in the plane of the window panels that illustrates a closure mechanism for a rear window slider assembly according to one embodiment of the present specification in a closed position.

In FIG. 4A, the closure mechanism in one embodiment of the present specification is shown. In this example, the closure pin 13 with associated coil spring 14 is positioned in the border region 11 located on the left or right side of the transparent region 9 of the slidable window panel 5. Placing the closure pin 13 in this location allows the length of the pin to be unrestricted. This placement allows for a closure pin 13 to have a length ($L_2$) that is greater than the length ($L_1$) of a similar pin found in a conventional slidable window assembly. Thus the indentation or hole 17 in this embodiment of the present specification may have a depth that is greater than the depth of the hole established for a conventional slider assembly. The increased length of the closure pin 13 and depth of the indentation 17 may assist in inhibiting the start of any "wobble" or looseness that may be encountered when the window is in its closed position.

The indentation 17 in the embodiment of the present specification shown in FIG. 4A further comprises an inclined wall or ramp 21. This inclined wall 21 increases the depth of the indentation 17 from its origination point in the closure track to its end point at the end of the closure track. This inclined wall assists in moving the slidable window panel 5 towards the fixed window panel 7 when the window opening is being closed, thereby, enhancing the performance of any seal member. The inclined wall 21 as shown in FIG. 4A makes an angle ($\phi_2$) with the closure track 15 in frame 16 that is greater than about ninety degrees.

In FIG. 4B, an orthographic (top-down) view of the closure track described in FIG. 4A in which the slidable window panel 5 moves is shown. The closure track 15 follows an axis $a_1$-$a_1$ that is parallel to the path of the slidable window 5 and fixed window 7 panels. The end of the closure track 15 in which the closure pin 13 comes to rest in the inclined indentation 17 when the slidable window panel 5 is closed bends away or deviates from the linear path, axis $a_1$-$a_1$, of the slidable window panel. An axis b-b drawn along this bend in the closure track 15, will intersect with axis $a_1$-$a_1$, thereby, making an acute, predetermined angle ($\delta$) with axis $a_1$-$a_1$ as shown in FIG. 4B. This departure angle ($\delta$) may range from 0 degrees to less than about 90 degrees with less than about 75 degrees being preferred, in order to force the slidable window panel 5 towards the fixed window panels 7. This closure mechanism results in improved performance for the weatherable seal by enhancing the compression of a seal member (19).

In FIG. 4C, an orthographic (top-down) view of the closure track according to another embodiment of the present specification is shown. This closure track 15 follows axis $a_1$-$a_1$, which is parallel to the path of the slidable window 5 and fixed window 7 panels. The closure track near the closure mechanism bends away or deviates from the linear path, axis $a_1$-$a_1$. An axis b-b drawn to coincide with this bend in the closure track 15, intersects with axis $a_1$-$a_1$, thereby, making the acute, predetermined departure angle ($\delta$) with axis $a_1$-$a_1$ as previously described. In this embodiment, the end of the closure track bends a second time in another direction as indicated by axis $a_2$-$a_2$. As shown in FIG. 4C, axis $a_2$-$a_2$ and axis $a_1$-$a_1$ may be approximately parallel to each other.

Accordingly, the force exerted by spring 14 urges pin 13 against ramp 21. The inclination of ramp 21 urges window assembly 3 toward its closed position. Simultaneously, the inclined wall creates a clamping force between the slidable window panel 5 and the fixed window panels 3 enhancing compression of the seal member 19.

A person skilled in the art will recognize from the previous description and figures that modifications and changes can be made to the present specification without departing from the scope of the specification as defined in the following claims.

What is claimed is:

1. A rear window assembly for a vehicle comprising:
   a window frame;
   at least one fixed window panel having a least one perimeter edge defining a portion of an opening;
   a movable window panel capable of movement between a closed position which closes the opening and an open position which exposes the opening;
   wherein a surface of the movable window panel is allowed to slidably move past a surface of the fixed window panel in a substantially linear path;
   a seal member present on the perimeter surface of at least one window panel;
   at least one closure pin and one coil spring mounted with the movable window panel; and
   the window frame forming a closure track in at least one edge of the window frame and an indentation that can interact with the closure pin, the closure track having a bend that makes a predetermined departure angle ($\delta$) from the linear path of the movable window panel and an inclined wall that connects the indentation to the closure track through a predetermined incline angle ($\phi_2$), the predetermined incline angle ($\phi_2$) being greater than 90°; the inclined wall cooperating with the closure pin, which is urged into contact with the inclined wall by the coil spring, to assist in moving the movable window panel towards the fixed window panel, thereby, urging the window assembly toward its closed position;
   wherein the closure track forces the movable window panel and the fixed window panel closer together placing the seal member under compression.

2. The window assembly of claim 1, wherein the movable window panel is further comprised of a substantially transparent region and a border region or sash.

3. The window assembly of claim 2, wherein the transparent region and the border region are formed from glass or a thermoplastic material.

4. The window assembly of claim 2, wherein the transparent region and the border region are formed of the same material.

5. The window assembly of claim 2, wherein the transparent region and the border region are formed of different materials.

6. The window assembly of claim 2, wherein the border region is substantially opaque.

7. The window assembly of claim 2, wherein the thermoplastic material forming the transparent region is selected from the group of polycarbonate resins, acrylic resins, polyarylate resins, polyester resins, polysulfone resins, and mixtures and blends thereof.

8. The window assembly of claim 2, wherein the thermoplastic material forming the border region is selected from the group of polyamides, acrylics, polyalkyene terephthalates, polycarbonates, polyurethanes, acrylonitrile butadiene styrene (ABS), polyesters, nylon, polyoxymethylene (POM), nylon, polypropylene, and mixtures or blends thereof.

9. The window assembly of claim 1, wherein the predetermined departure angle ($\delta$) is an acute angle established at the intersection between the bend in the closure track and the linear path of the slidable window panel.

10. The window assembly of claim 9, wherein the predetermined departure angle ($\delta$) is less than about ninety degrees.

11. The window assembly of claim 10, wherein the predetermined departure angle ($\delta$) is less than about seventy-five degrees.

12. The window assembly of claim 1, wherein the closure pin is pushed by the coil spring to span the full depth of the closure track.

13. The window assembly of claim 11, wherein the closure pin is located in the border region on either the left or right side of the movable window panel.

14. The window assembly of claim 1, wherein the closure track is formed from a thermoplastic material 15. The window assembly of claim 1, wherein the closure track is integrally formed by an injection molding, thermoforming, or an extrusion process.

* * * * *